United States Patent [19]

Union

[11] 4,231,015
[45] Oct. 28, 1980

[54] MULTIPLE-PROCESSOR DIGITAL COMMUNICATION SYSTEM

[75] Inventor: Donald C. Union, La Jolla, Calif.

[73] Assignee: General Atomic Company, San Diego, Calif.

[21] Appl. No.: 946,566

[22] Filed: Sep. 28, 1978

[51] Int. Cl.³ .................... H04Q 9/00; G06F 11/00
[52] U.S. Cl. .................. 340/147 R; 364/119; 364/200; 371/11
[58] Field of Search ........ 340/147 R, 147 SC, 147 T, 340/146.1 BA; 179/15 AL; 364/119, 103, 200

[56] References Cited

U.S. PATENT DOCUMENTS

| | | | |
|---|---|---|---|
| Re. 28,958 | 9/1976 | Zafiropulo et al. | 340/147 SC |
| 3,200,192 | 8/1965 | Auwaerter et al. | 178/3 |
| 3,238,506 | 3/1966 | Jung et al. | 340/172.5 |
| 3,312,954 | 4/1967 | Bible et al. | 340/172.5 |
| 3,380,031 | 4/1968 | Clayton et al. | 340/172.5 |
| 3,593,290 | 7/1971 | Kerr | 340/147 R |
| 3,633,169 | 1/1972 | Bickford | 340/172.5 |
| 3,659,271 | 4/1972 | Collins et al. | 340/172.5 |
| 3,665,404 | 5/1972 | Werner | 340/172.5 |
| 3,680,056 | 7/1972 | Kropfl | 340/172.5 |
| 3,748,647 | 7/1973 | Ashany et al. | 340/172.5 |
| 3,749,845 | 7/1973 | Fraser | 179/15 AL |
| 3,752,932 | 8/1973 | Frisone | 179/15 AL |
| 3,755,789 | 8/1973 | Collins | 340/172.5 |
| 3,781,815 | 12/1973 | Boudreau et al. | 340/172.5 |
| 3,806,885 | 4/1974 | Moore | 340/172.5 |
| 3,810,100 | 5/1975 | Hungerford et al. | 340/172.5 |
| 3,866,175 | 2/1975 | Seifert, Jr. et al. | 340/152 R |
| 3,879,582 | 4/1975 | White et al. | 179/15 AL |
| 3,879,710 | 4/1975 | Maxemchuk et al. | 340/172.5 |
| 3,883,690 | 5/1975 | Kolensky et al. | 340/151 X |
| 3,883,691 | 5/1975 | Pilc et al. | 340/151 X |
| 3,895,357 | 7/1975 | Neuner et al. | 340/151 |
| 3,904,829 | 9/1975 | Martin et al. | 179/15 AL |
| 3,932,841 | 1/1976 | Deerfield | 340/146.1 BA |
| 3,958,226 | 5/1976 | Kuroda et al. | 340/172.5 |
| 4,007,441 | 2/1977 | Faber | 340/147 R |
| 4,007,450 | 2/1977 | Haibt et al. | 340/172.5 |
| 4,011,545 | 3/1977 | Nadir | 340/172.5 |
| 4,023,140 | 5/1977 | Siems et al. | 340/15.5 TS |
| 4,031,512 | 6/1977 | Faber | 340/147 R |
| 4,032,893 | 6/1977 | Moran | 340/166 R |
| 4,035,770 | 7/1977 | Sarle | 340/147 R |
| 4,047,162 | 9/1977 | Dorey et al. | 364/200 |
| 4,072,923 | 2/1978 | Siems | 340/15.5 TS |
| 4,090,248 | 5/1978 | Swanson et al. | 340/147 R |
| 4,133,027 | 1/1979 | Hogan | 364/119 |

OTHER PUBLICATIONS

Cutler-Hammer, Inc. publication entitled "Directrol Multiplexer", 20 pp.
Westinghouse Electric Corporation Bulletin entitled "Remote Input/Output System", Sep. 1976, pp. 1–4.

Primary Examiner—Donald J. Yusko
Attorney, Agent, or Firm—Fitch, Even, Tabin, Flannery & Welsh

[57] ABSTRACT

A digital communication system is disclosed for communicating among two central consoles and a plurality of local controllers, such as may be used in a radiation and monitoring system and the like. Communication occurs between each of the consoles and all of the local controllers via dual paths. Each path is independent of the other and each extends from one of the consoles to all of the local controllers from opposite directions, thereby forming a unique noncontinuous loop.

1 Claim, 6 Drawing Figures

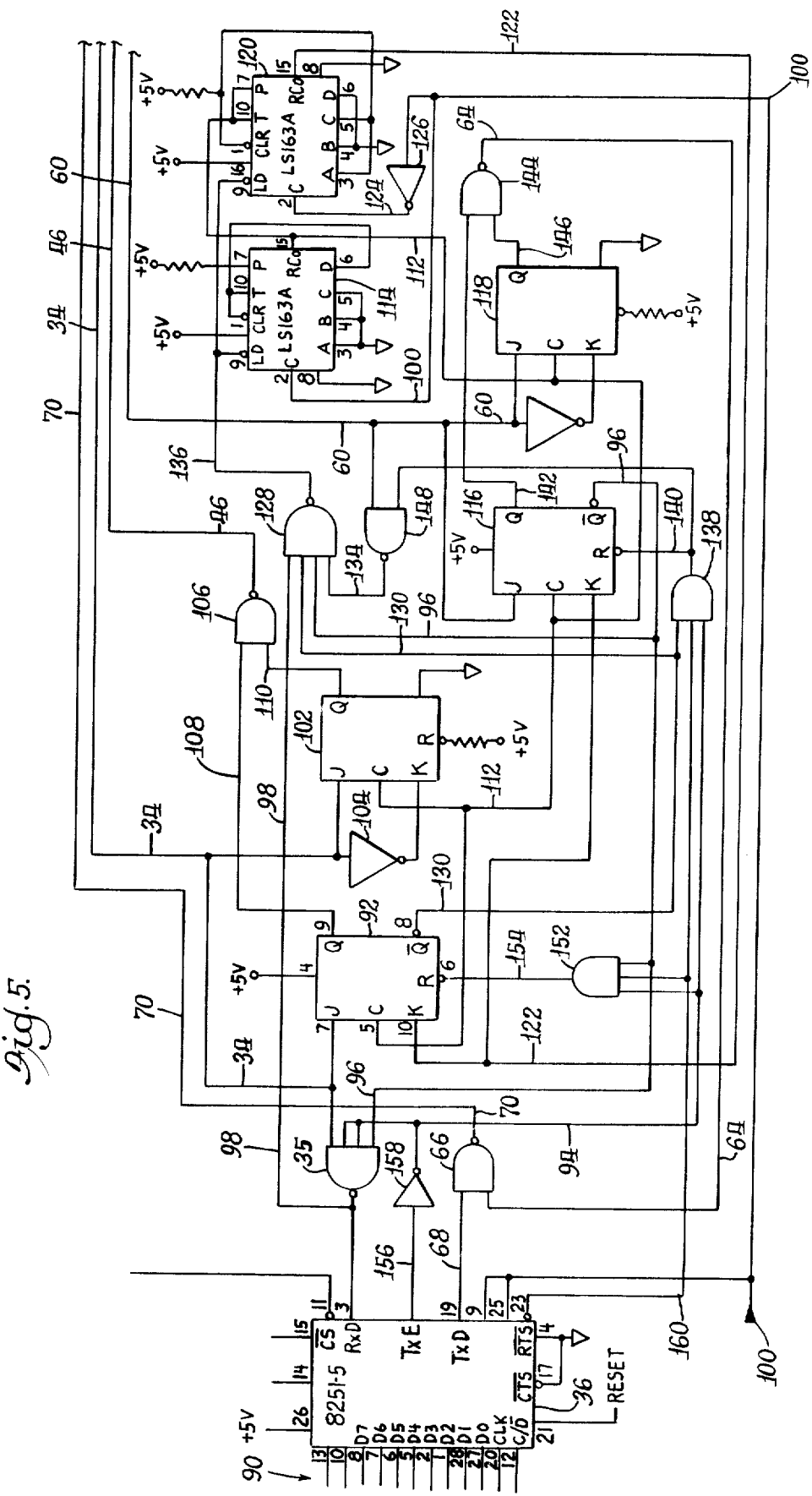

MULTIPLE-PROCESSOR DIGITAL COMMUNICATION SYSTEM

The present invention generally relates to digital communication systems, and more particularly to systems of the type which can be used in radiation monitoring systems where system reliability must be maintained at a high level.

There has been much research and development activity directed toward digital communication systems that transmit data between one or more consoles and a number of remote devices using one or more communication loops. Many communication systems, including those that are used in radiation monitoring of nuclear power stations and the like, must have protective safeguards which insure system integrity even when a fault or malfunction occurs in one or more of the components thereof. While systems have been developed which utilize a single loop that can be reconfigured at certain locations to isolate a fault, they usually have a single path forming a continuous loop and also often have a single console. Other reconfigurable systems have been relatively fixed in that they restructured the communication buses into another of a few predetermined reconfigurations and did not have any substantial operational flexibility. Communication systems have also been devised which have multiple central consoles for redundancy, and which enabled a second console to take over operation of the system in the event that the first console went down, but communication from each console to the local controllers has generally been through a separate loop, i.e., each console controlled a single loop which extended to each of the local controllers.

Accordingly, it is an object of the present invention to provide an improved system for communicating among two central control consoles and a plurality of local controllers, such as may be used in a radiation monitoring system and the like, wherein the system has two independent paths of communication in a unique noncontinuous loop and wherein the system has extreme flexibility in its operation and ability to isolate faults or malfunctioning local controllers and still maintain communication among all other controllers and both consoles.

Another object of the present invention is to provide a system wherein the local controllers are linked together by two communication paths, wherein each path is independent of the other and wherein a local controller can be isolated from the paths without destroying communication between all other controllers by either console via one or the other of the paths.

Yet another object of the present invention lies in the provision of having an independent two wire communication path extending from each console to the local controllers, each of which is capable of being reconfigured by each local controller in the sense that each local controller is capable of blocking transmission in either direction along the path as well as isolating itself from the path without affecting communication in either direction along the path.

Yet another object of the present invention is to provide a system wherein command messages are processed by all controllers and response messages are made by the addressed controller and are not processed by the other controllers. As the often lengthy response messages are relayed through the other controllers, their processing means do not see them and are not burdened by them.

Still another object of the present invention is to provide a system of the foregoing type wherein each of the local controllers selectively block communication in one or both of the communication paths in the event of a runaway transmission by one of the local controllers and wherein the system systematically reconnects the local controllers onto the previously blocked communication paths in a manner whereby the malfunctioning controller is isolated and thereby enables communication to be re-established among the consoles and all other controllers in the system.

A more detailed object of the present invention is to provide a system that utilizes bidirectional duplex communication links between local controllers wherein command messages originating at a console are transmitted in one direction and response messages from a local controller are transmitted in the opposite directions and wherein reflections of these messages are blocked from being transmitted in the wrong direction.

Other objects and advantages will become apparent upon reading the following detailed description, while referring to the attached drawings, in which.

Figure 3:
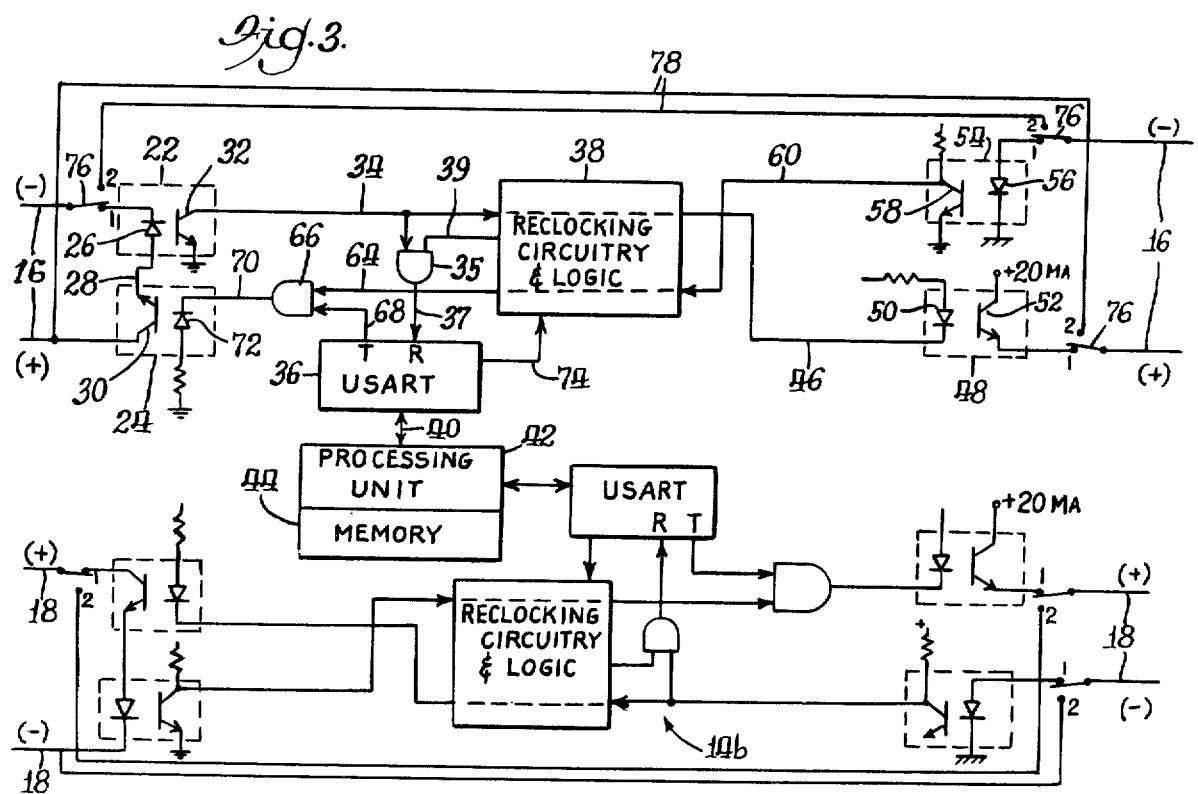
FIG. 3 illustrates a more detailed block diagram of a local controller of the system embodying the present invention.

FIG. 5 comprises an electrical schematic circuit diagram of the circuitry of the local controllers shown in the block diagram of FIG. 3.

Broadly stated, the present invention comprises a communication system that can be used in radiation monitoring and control systems of a nuclear power station and the like, which has extreme flexibility of operation which contributes to its overall reliability to carry out the communication functions that are necessary in such an application. Because system reliability is of such critical importance in such an environment, the present invention incorporates many desirable system features such as redundancy and the ability to reconfigure or isolate malfunctioning components and does so in a unique manner as will become apparent. The system utilizes two central control consoles, with a communication path extending from each console to all of the local controllers that are part of the system and also includes an interconnection between the two consoles. When the system is operating without a malfunction or fault, each console can communicate with any local controller in the system via its own independent half duplex two wire communication path which extends from the console to all of the local controllers. A communication path is also provided between the consoles which enables one console to use the other console's direct communication path in the event that a malfunction occurs in its own path. If the malfunction occurs at a local controller that is, for example, in the middle of the group of local controllers, all controllers upstream of the malfunctioning controller can be communicated with by the subject console directly through its communication path and all controllers downstream or beyond the malfunctioning controller can be communicated with via the second communication path, the other console and the interconnection between consoles. (As a matter of definition herein, upstream relative to a local controller is intended to mean toward the console in the particular communication path and downstream is intended to be away from the console in the path. Thus, the local controller would be upstream from another in one path, but downstream from the other in the other path.) In the above example, the malfunctioning controller can be isolated and communications can be continued between the console and all other local controllers in the system.

Figure 1:
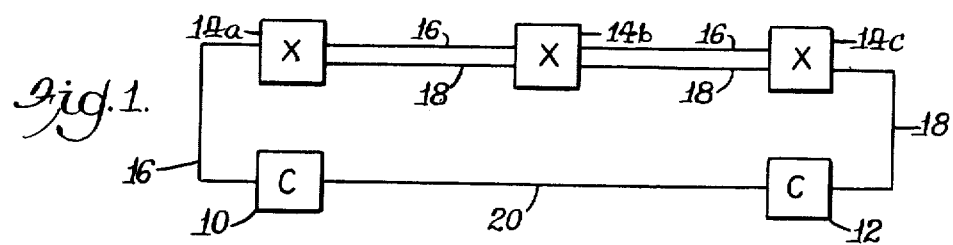
FIG. 1 is a greatly simplified block diagram of the system embodying the present invention, and particularly illustrating two consoles and a number of local controllers that are connected by the unique noncontinuous loop having dual paths of communication.

The capability of isolating a local controller prevents a malfunctioning local controller from interrupting communication between a console and several of the controllers as is the case with many prior art systems. This aspect of the system can be more readily understood by referring to FIG. 1 which is a greatly simplified block diagram embodying the system and includes two central consoles 10 and 12, as well as a plurality of local controllers, the block diagram of which includes only three controllers 14a, 14b and 14c. The console 10 is connected to the controllers via a communication path 16 and the console 12 is connected to the same controllers via the communication path 18. A communication path 20 extends between the consoles 10 and 12. Each of the communication paths 16, 18 and 20 preferably comprises half duplex, two wire cables and the paths 16 and 18 are independent from one another. During normal operation, the console 10 can communicate with the controllers via communication path 16 and the console 12 can communicate with the same controllers via the communication path 18. The advantages of the noncontinuous loop is that communication between one console and the controllers is independent of the communication between the controller and the other console by virtue of the independent paths 16 and 18, and yet, when a controller 14 fails and does not relay command messages from one console, that console can communicate through the other console to the controllers beyond the failed one. More specifically, in the event that controller 14b fails, console 10 can communicate with controller 14a via the path 16 and can also communicate with controller 14c via communication path 18, console 12 and the path 20. Each console remains master over all communications along its path through the controllers and merges communication requests from the other console into its own communication stream.

Each of the paths 16, 18 and 20 comprises a 2-conductor half duplex serial communication channel, with both conductors carrying the messages in both directions, since the messages are relayed by controlling the current flow through the conductors. Thus, referring to FIGS. 2a and 2b, which illustrate a portion of local controllers 14a and 14b with the 2-conductor communication path 16 between controllers 14a and 14b forms a loop, with a current source i being provided for the loop by the controller 14a. There needs to be only one current generator for each loop and, accordingly, the current generator i of the local controller 14a supplies current for use by transmitter T2, receiver R2 of local controller 14a, as well as transmitter T1 and receiver R1 of the local controller 14b. Similarly, the current source of local controller 14b supplies the current states for the loop of which transmitter T1 and receiver R1 are apart. It should be appreciated that the console 10 would similarly have a current source for use in the loop containing receiver R1 and transmitter T1 of controller 14, while console 12 would not need a current source, since the local controller 14c would have one. The transmitters T2 in controller 14a and transmitter T1 in controller 14b switch the current flow and therefore control the communication between the two controllers. Receiver R2 (of controller 14a) and R1 (of controller 14b) will both receive any transmission that is provided by transmitters T2 and T1 in the loop. This can be readily understood when it explained that the receivers are light emitting diode portions of opto-isolators and the transmitters are the photo-transistor portion of other opto-isolators.

Figure 2A:
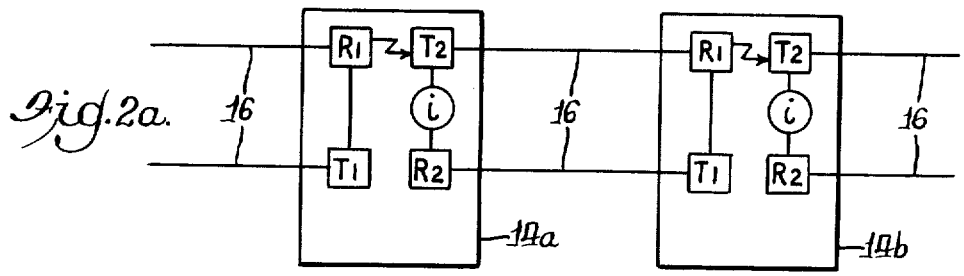
FIGS. 2a and 2b are simplified block diagrams showing a portion of a single bidirectional duplex communication path together with a portion of two local controllers.
Figure 2B:
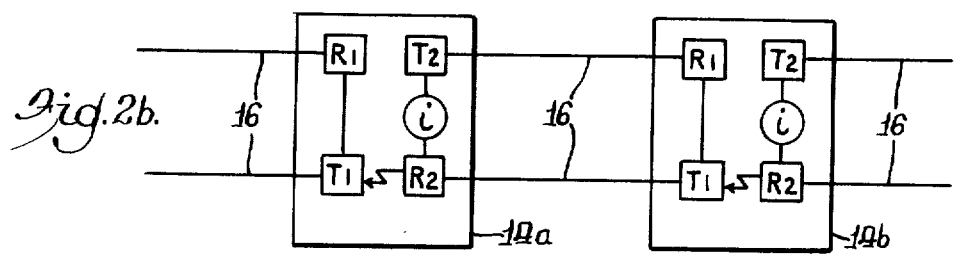

Referring only to FIG. 2a, as a command message from console 10 is transmitted on lines 16 shown to the left of controller 14a, the message being comprised of one or more 10 bit words, wherein each word has a start bit, 8 bits of data, followed by a stop bit, it is received by receiver R1 of controller 14a and is relayed to the transmitter T2 for further transmission along lines 16 to controller 14b where it is received by the receiver R1. Receiver R1 of controller 14b then relays the message to transmitter T2 for further transmission throughout the controllers in the path. The message that is transmitted by a transmitter T2 is also received by receiver R2, and in accordance with the present invention, these command messages are not relayed from receiver R2 to the transmitter T1 of the same local controller because if such was done, the receiver R1 therein would receive the transmission from transmitter T1 and would thereby mix the message with subsequent incoming communications from the console.

The local controllers also generate response messages to the command messages, provided the command message has addressed the particular local controller, it being understood that all local controllers receive and process all command messages and only the local controller in which a unique address identifying the same generates a response. In the event that a response is generated, it is transmitted back to the console to provide the requested information. During the transmission of the response message and referring to FIG. 2b, a response message from local controller 14c, for example, (not shown) would appear on the right-most lines 16 and be received by the receiver R2 of controller 14b which would relay the message to transmitter T1 which would transmit it to receiver R2 of controller 14a as well as to its own receiver R1. Receiver R2 of controller 14a would relay the message to transmitter T1 which would transmit the message back to the console as desired. Receiver R1 of controller 14a would not relay the message to transmitter T2 (or receiver R1 to transmitter T2 in controller 14b) for if this happened, the action of transmitter T2 of controller 14a would be received by receiver R2 which would be mixed in with the new responses being originated by the local controller 14c. Thus, as is evident from the foregoing brief description of FIGS. 2a and 2b, the reflected signals are blocked by logic (not shown) that detects a new message in one direction and blocks all messages in the opposite directions. In other words, when command messages are being transmitted along lines 16 to the right, receivers associated with response messages are precluded from relaying any reflected command messages to response message transmitters and, conversely, when response messages are being transmitted, command message receivers do not relay any reflected messages to the command message transmitters. This insures that command messages travel the full length of the communication path so that an addressed local controller will receive, process and respond to the command message and the response messages will be transmitted back to the console as desired and will not be reflected and transmitted in the wrong direction.

To accomplish the necessary relaying of messages in the proper directions without generating any reflected messages in the incorrect direction, logic and gating is used as will now be described in conjunction with the block diagram shown in FIG. 3 which illustrates a single local controller 14b. It is shown to have leftward pairs of lines 16 and 18 which extend to the local controller 14a and rightward pairs of lines 16 and 18 which extend to local controller 14c. Referring to the upper-left lines 16, they are shown to be connected to opto-isolators 22 and 24, with the upper-left line 16 entering the opto-isolator 22 being connected to a light emitting diode 26 which in turn is connected via line 28 to a photo-transistor 30. The light emitting diode (LED) 26 is optically coupled to a photo-transistor 32 having its collector connected to line 34 which extends to an AND gate 35, the output of which is connected to the receiving input of a universal synchronous/asynchronous receiver/transmitter (USART) 36 via line 37. The line 34 is also connected to a reclocking circuit 38. The command messages from the console 10 appear on line 34 and are gated through AND gate 35 to be received by the USART 36 which converts the serial data to parallel data and forwards it via line 40 to a processing unit 42 having an associated memory 44. The processing unit determines if the command message is intended for the particular local controller 14b. By virtue of the fact that the lines 16 may be quite long, the command message may be appreciably degraded and it is for this reason that the reclocking circuitry 38 essentially reshapes the data, delayed by a predetermined amount (approximately ½ of one bit of serial data) and the message is essentially reshaped and appears on line 46 which extends to an opto-isolator 48, the line 46 being connected to a LED 50 which is optically coupled to a photo-transistor 52 which provides the on-off current states on the lines 16 which extend to the local controller 14c.

If it is assumed that the local controller 14c or some other downstream local controller has been addressed and requested to provide a response message, it will appear on the rightward lines 16, the upper one of which extends to an opto-isolator 54, the line being specifically connected to a LED 56 that is optically coupled to a photo-transistor 58, the collector of which is connected to line 60 that extends to reclocking circuitry 38 that accomplishes the same task that is performed with respect to the data on line 34. The reclocking circuitry 38 response message output appears on line 64 which extends to one input of an AND gate 66, the other input of which is supplied by line 68, the transmitter output of the USART 36. The output of the AND gate 66 appears on line 70 is connected to a LED 72 and the data that is present on line 70 will cause the LED 72 to selectively switch the photo-transistor 30 so that the response message can be transmitted via the leftward lines 16 back to the console 10 as desired.

It should be appreciated that the photo-transistor 30 is in the same current loop as the LED 26 so that a response message will also be detected by the photo-transistor 32 and will therefore be available on line 34. However, the operation of the circuitry is such that the gate 35 is disabled when a response message is being reclocked through the controller or if a response message is being generated by this controller. Since the response message is reflected onto line 34 is not desired to be transmitted through the reclocking circuitry 38 onto line 46 toward the rightward local controllers since line 46 should only carry command messages, the reclocking circuitry 38 automatically inhibits this portion of the circuitry and effectively blocks the reflected message. In a similar manner, transmission of a command message on line 46 will cause the opto-isolator 48 to operate and this message will be detected by the opto-isolator 54 via lines 16. Thus, the reflected command message will be present on line 60. However, the reclocking circuitry 38 will automatically block this path so that the command message will not be sent back upstream toward the console.

The system is designed to issue a poll to each local controller at predetermined intervals. If the processing unit 42 of the local controller 14b fails to receive a poll on path 16, its processing unit 42 automatically issues a signal to the USART 36 causing it to apply a signal on a line 74 that causes the reclocking circuitry 38 to block transmission in both directions. The processing unit also has associated timing circuitry which determines if the processing unit is properly operating, i.e., the processing unit must issue a particular signal to the circuitry at regular intervals. If the signal is not received by the timing circuitry, it shuts down the processing means and also de-energizes relays which isolate the entire local controller from the lines 16. The timing circuitry is not specifically shown but is easily constructed and may comprise a monostable multivibrator which is adapted to time out and provide a suitable output signal if it does not receive the regular pulses (1 per second, for example) from the processing means. The isolation is accomplished by relay contacts 76 switching from position 1 to position 2 where lines 78 effectively bypass the entire local controller. The circuitry shown in the lower half of FIG. 3 is virtually identical to that shown and described with respect to the communication path 16, the lower half merely comprising circuitry for the path 18.

Figure 4:
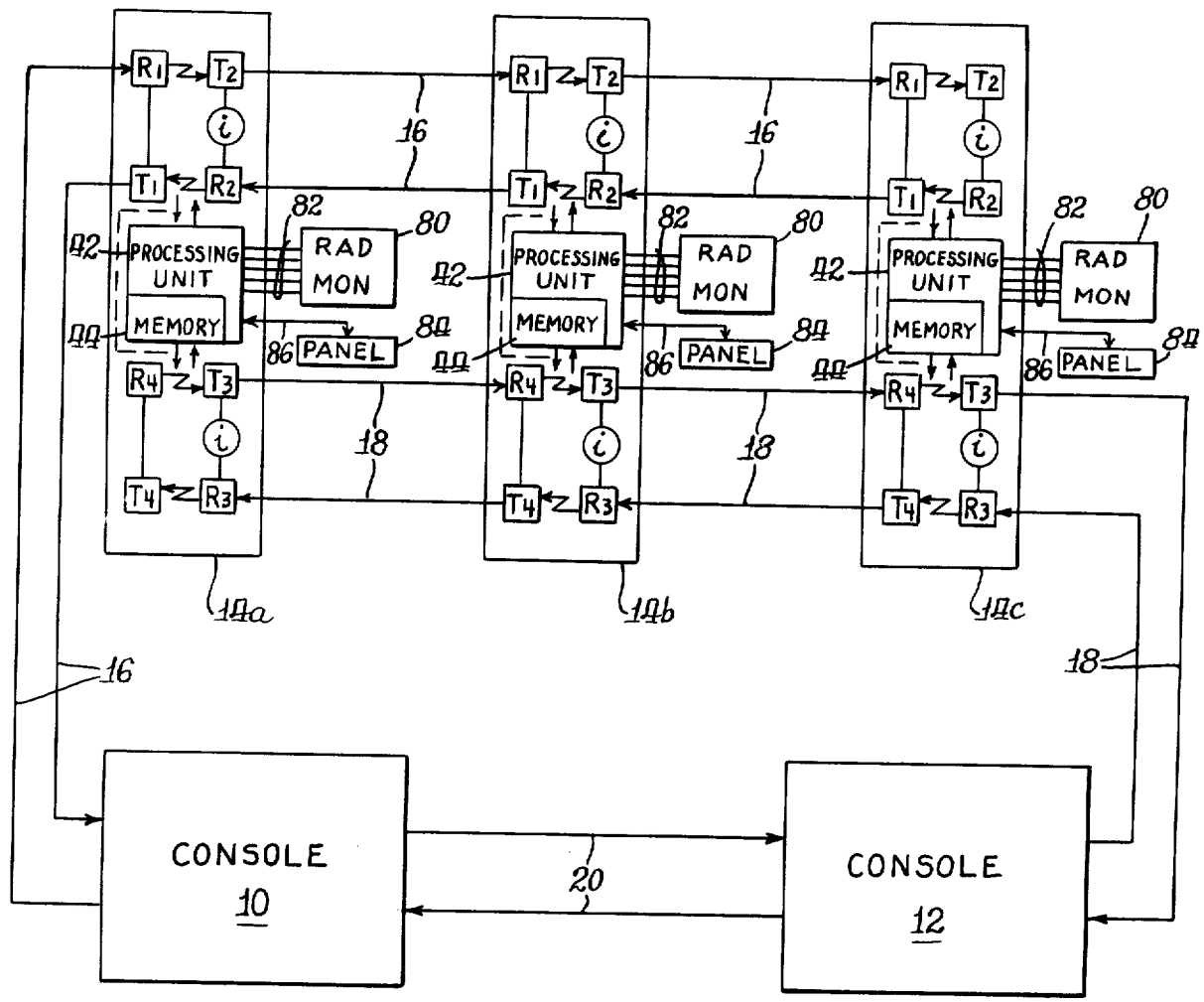
FIG. 4 illustrates yet another simplified block diagram of the system embodying the present invention, and illustrating two central consoles, the dual duplex bidirectional communication paths and three local controllers in the environment of a radiation monitoring system.

The communication system of the present invention is particularly adapted for use in radiation monitoring systems and a block diagram of an entire system in this kind of environment is shown in FIG. 4 and includes the consoles 10 and 12, the communication paths 16, 18 and 20, and the receivers and transmitters. The local controllers have a processing unit 42 and memory 44 and also have radiation monitors 80 connected thereto by lines 82. A panel 84 which may include a display and keyboard is also connected to the processing unit via lines 86.

The overall operation of the system having the local controllers 14a, 14b and 14c to consoles 10 and 12 in the manner as shown in FIG. 4 with the local controllers having circuitry generally as shown in FIG. 3 will now be described. If a console command message is transmitted via communication path 16 to the local controllers, all controllers accept and process the message to determine which controller is being addressed. If the command message from the console 10 is addressed to local controller 14b, for example, the controller will originate the response message after the command message is completely received. The response message is forwarded by USART 36 via gate 66 and line 70 to the transmitter comprised of the opto-isolator 24, and is sent back to the console 10 via the local controller 14a. As is evident from the circuitry of FIG. 3, a response message is relayed back through the upstream local controllers without their processing means 42 seeing the response message and this prevents the processing means of the local controllers from being burdened by the often lengthy response messages that pass along the communication path 16. The response messages may be quite long because they contain large amounts of data from the distributed data base stored and maintained within each controller.

One of the many advantages of the present system is that a runaway or continuously operating transmitter will not prevent each console 10 or 12 from providing command messages to all other local controllers and receiving responses from them. If the transmitter T2 of controller 14b were transmitting a command message and began malfunctioning so as to transmit continously, communication along path 16 from the console 10 would be jammed to downstream local controllers, i.e., controllers 14c (and any other local controllers beyond 14c is a large number were incorporated in the system). Console 10 would send commands to controller 14c by routing the commands through console 12. Console 12 would merge these commands with its own commands and also remain master over its independent communication path 18 through the local controller. The first communication path 16 is jammed between local controller 14b and 14c but the second path 18 is independent of that jam because the communication loop is noncontinuous.

Similarly, if a response transmitter, e.g., transmitter T1 in the local controller 14c, were to transmit continuously, no communication would be possible along path 16. Thus, periodic polling messages from the console 10 along path 16 would not be possible. When the processing means 42 of a local controller does not receive a polling command message for a predetermined time interval, it will block the relaying of messages in either direction. In terms of what is being accomplished by the circuitry shown in FIG. 3, a processing means 42 instructs the USART 36 to provide a signal on line 74 to inhibit the reclocking circuit 38 so that any response messages received by the receiver 54 and which appear on line 60 as well as command messages on line 34 are not reclocked and will therefore not be passed to the respective transmitters 24 and 48.

Since the response transmitter T1 of local controller 14c was operating continuously and prevented any command messages from being transmitted on the communication path 16, the processing unit of all local controllers 14a, 14b and 14c causes similar blocking of the response messages. After the jamming is stopped, console 10 will initially command controller 14a to permit it to generate a response and if the path is not jammed by operation of the local controller 14a, it will send a response message. The console will then send a command message commanding local controller 14b to issue a response message which, in the described example, will result in proper operation. When the console 10 commands local controller 14c, the faulty transmitter T1 will again jam the communication path and the console 10 will thereby locate the fault and issue an alarm that controller 14c has a faulty transmitter on communication path 16. The controllers will again provide the blocking action in the same manner and the console 10 will repeat the reconnection process but will not poll controller 14c, since it now knows that this controller has a faulty transmitter in communication path 16.

It should be appreciated that the foregoing discussion has described the local controller as having a faulty response transmitter T1 for communication paths 16 which could also comprise transmitters T3 for communication path 18. Since as previously mentioned, the transmitters are essentially the equivalent of opto-isolators from the foregoing discussion with respect to FIG. 3, it should be appreciated that a runaway transmission can actually be a malfunctioning USART or some other component. If a malfunction occurs in the processing unit, it will very likely fail to generate the necessary periodic timing signal that is monitored by timing circuitry, which will result in the relays being switched so that the contacts 76 and lines 78 will bypass the local controller circuitry associated with path 16. Since the processing 42 in a local controller is connected to both the USART associated with communication path 16 as well as the USART associated with communication path 18, a malfunction of the processing unit 42 could result in the lower portion (FIG. 3) of the local controller circuitry also being similarly bypassed.

The foregoing discussion has been concerned with describing the operation of the system in general terms. The detailed operation of the local controllers in the system will now be described in conjunction with a detailed electrical schematic circuit diagram which is set forth in FIG. 5, which represents one embodiment of specific circuitry that can be used to carry out the general operation of the block diagrams of FIGS. 1 through 4.

Turning now to FIG. 5, it is shown to have the lines 70, 34, 46 and 60 at the upper-right corner of the drawing which extends to the reclocking circuitry and logic 38 with the associated USART 36 being located to the left thereof. The reclocking circuitry and logic 38 is intended for use by the channel associated with the communication path 16 and a second essentially identical reclocking circuit would be required for the other communication path 18. The operation of the circuitry associated with the communication path 16 will only be described herein since it is essentially duplicated with respect to the communication path 18. While the transmission of the messages along the communication paths 16 and 18 is serial transmission, and the messages that are received and transmitted by the USARTs onto these paths is also serial, communication between the USART 36 and the processing means is parallel transmission on eight separate data lines identified as line 90 which extend to the processing unit 42.

With respect to the operation of the circuitry shown in FIG. 5, when a command message is being received from the console 10 after having come through the opto-isolator 22, it appears on line 34 and is applied to the NAND gate 35 as well as to a flip-flop 92. The other input lines 94 and 96 to the NAND gate 35 are normally high so that the data is gated onto line 98 that extends to the receiver terminal of the USART 36. As previously mentioned, the data is in the form of 10 bits, including an initial start bit, eight data bits and a stop bit, with the start and stop bits being high bits. As soon as all 10 bits are received by the USART 36, it communicates with the processing unit 42 and forwards the data to it via lines 90.

Data from the processing unit is similarly written into the USART 36 via lines 90 and the 10 bits of data can then be serially transmitted by the USART 36 onto line 68. After the 10 bits have been transmitted, the USART then communicates with the processing unit and the latter forwards another 8 bit word on lines 90 to the USART.

The USART 36 is clocked to produce a BAUD rate of preferably about 4800 although higher and lower rates can, of course, be utilized. A clock signal for the USART is applied on line 100 which is produced by a conventional clock generator not shown. The clock rate on line 100 is 16 times the data rate of the command and response messages that are transmitted along the paths 16 and 18.

As previously mentioned, the command message that is received on line 34 and which is processed by the USART 36 and the processing unit 42 as described, is also transmitted to all other local controllers for processing in a similar manner. If the address contained in the command message is determined to be that of a particular local controller, then it can generate its response message and transmit it via the USART onto line 68, through NAND gate 66 and onto line 70 which will cause the opto-isolator 24 to apply the message onto lines 16 extending back toward the console 10. The command message on line 34 as previously mentioned is applied to the J input of the JK flip-flop 92 as well as to the J input of a flip-flop 102. The data is also inverted by an inverter 104 and applied to the K input of the flip-flop 102. The Q output of flip-flop 92 is applied to a NAND gate 106 via line 108 and the Q output of flip-flop 102 is also applied to the NAND gate 106 via line 110. During operation, the data that present in the data stream is actually clocked through the flip-flop 102 which essentially reclocks the same and applies it onto line 46 as the flip-flops 92 and 102 are clocked by clock line 112.

In accordance with an important aspect of the reclocking circuitry, the clock signal on line 112 which clocks the data through the flip-flops 92 and 102 is produced by a counter 114 which is a four bit binary counter that is preset to a count of seven and thereby reaches its terminal count of 15 after eight counts. The counter 114 is clocked by a clock signal on the line 100 and is at a rate that is 16 times the rate of the data that is being received on line 34. As soon as the counter 114 is allowed to count, it counts eight counts before it reaches its terminal count, in which event the output line 112 goes high, and provides the clock signal to the flip-flops 92 and 102, as well as to two additional JK flip-flops 116 and 118 which reclock the response messages being received on line 60 as will be hereinafter explained. The use of the counter 114 essentially permits the circuitry to examine the initial high start data bit to determine if it is a legitimate data bit as opposed to a short duration noise pulse or the like. Since the clock rate to the counter 114 is 16 times the data rate, and by virtue of its being preset to a count of seven, its terminal count which produces a high signal on line 112 will occur in the middle of a legitimate start bit. A second counter 120 is provided adjacent the counter 114 and effectively provides a high output on line 122 when it has received 10 counts, corresponding to the full 10 bit word. This is accomplished by presetting the counter to five and incrementing it until it reaches its terminal count of 15. While it is also clocked at the same rate at counter 114 by line 124 which has a signal that is the inverse of the clock signal on line 100 by virtue of having passed through an inverter 126, it is effectively only clocked at the same rate as the data messages and this is accomplished in the following manner. The output line 112 of the counter 114 is applied to two terminals of the counter 120 and these terminals must be high for the counter 120 to count and this only occurs at the terminal count of the counter 114. Thus, whenever the counter 114 reaches its terminal count, the counter 120 is incremented by one and after it has generated 10 counts, it reaches its terminal count which provides a high signal on line 122 that is applied to the K input of flip-flop 92 and resets it. As will be explained, this essentially turns off the counters and the reclocking circuitry is then ready to receive another 10 bit message.

To start the counters 114, the high start bit on line 34 results in line 98 going low and this line provides one input of a NAND gate 128, the other inputs of which are supplied by lines 130, 96 and 134 which are normally high before data is received. When line 98 goes low, output line 136 of the NAND gate 128 will go high and this line is connected to the load input of the counters 114 and 120 which takes them out of the load condition and enables them to start counting. Thus, when the start bit of the data message is received, the counters are permitted to run. After a total of 10 bits has been reclocked through the flip-flops 92 and 102, the counter 120 reaches it terminal count and a high is produced on line 122 which will reset the flip-flop 92. This causes the Q̄ output line 130 to go high at the next clock transition which will result in the AND gate 128 having a low output on line 136 which will place the counters back in their load condition, in essence turning them off. This is a desired result, since the 10 bits of data have been reclocked through the flip-flop 194 as desired.

The Q̄ output of the flip-flop 92 appearing on line 130 also accomplished the task of maintaining the counters on during the receipt of 10 bits of data since the active data between the start and stop bits will include low bits. This is accomplished by providing a low signal on line 130 whenever the data contains logical 0 or low bits, since a low level on lne 130 will maintain a high output from the NAND gate 128 that is connected to the load inputs of the counters 114 and 120. Whenever the active data in the 10 bit stream is a logical 1 or high level which would also include the high start and stop bits, line 98 will be low which will cause the NAND gate 128 to maintain its high output.

When command messages are being received on line 34 to be in turn received by the USART 36 and reclocked by the flip-flop 102 onto the output line 46, no communication can occur in the opposite direction, i.e., data on input line 60 cannot be reclocked through the flip-flop 118 in the opposite direction when data is being received on line 34. This is accomplished by the Q̄ line 130 of flip-flop 92 applying a low signal to an AND gate 138 which has its output on line 140 that holds the flip-flop 116 in a reset condition. Since the flip-flop 116 has its Q output on line 142 that extends to NAND gate 144, the other input of which is supplied by line 146 from the flip-flop 118, holding flip-flop 116 in a reset condition prohibits data from being clocked onto line 64 as is desired.

When a response message from a more distant local controller is received on line 60 and is to be reclocked toward the control console 10, the high start bit on line 60 is applied to NAND gate 148, the other input of which is supplied by line 140 and latter of which is normally high when the USART 36 is not transmitting and when the flip-flop 92 is reset. Thus, the high start bit on line 60 causes the NAND gate 148 to have its output line 134 switched from a normally high signal to a low signal which will cause NAND gate 128 to produce a high signal on line 136 which will start the counter 114 as is desired. The data will then be reclocked by flip-flops 116 and 118 in the manner substantially as described with respect to the flip-flops 92 and 102. When flip-flop 116 is clocked, its $\bar{Q}$ output on line 96 is applied to the NAND gate 128 which maintains its output high to permit the counter to keep running and the low signal on line 96 is also applied to an AND gate 152 having an output line 154 that will be held low and maintain the flip-flop 92 in its reset condition which prohibits its operating to reclock any data that may appear on line 34. This is important when it is considered that operation of the opto-isolator 24 by the response message being reclocked will be detected by the opto-isolator 22 and will be present on line 34 during operation and it is important that the flip-flops 92 and 102 not reclock this reflected message back toward the direction that the response message is originating. The $\bar{Q}$ output line 96 of the flip-flop 116 is also applied to the NAND gate 35 which causes its output line 98 to be held low and this precludes the reflected message that is present on line 34 from being received by the USART 36 as desired. The data on line 64 is passed through the flip-flop 66 onto line 70, since line 68 from the USART 36 will be normally high when it is not transmitting. Similarly, when it is transmitting, the other input of the NAND gate 66, i.e., line 64 will be normally high when no data is being received, so that the data being transmitted from the USART 36 onto line 68 will be gated onto line 70 as is desired. The USART 36 has an output line 156 which is connected to an inverter 158 that will provide a low signal on line 94 when it is transmitting so that the USART 36 will not receive its own transmission since it will be reflected and appear on line 34 by virtue of the operation of the opto-isolators 24 and 22 as previously mentioned.

As previously mentioned, if the processing means 42 associated with each local controller fails to receive a poll, i.e., a command message with its unique address within a predetermined time, it will automatically cause the reclocking circuitry to shut down so that messages can no longer be transmitted in either direction. This is accomplished by commanding the USART 36 to provide a low signal on line 160 which extends to AND gates 138 and 152 which will be effective to hold the flip-flops 92 and 116 in their reset condition.

From the foregoing, it should be appreciated that a communication system has been shown and described which has many desirable attributes and advantages which contribute to reliable operation in the environment of a radiation monitoring system or similar system where operational maintenance of communication in the system is of critical importance. The system provides the maximum communication to the maximum number of local controllers in the system even if a malfunction occurs in one of the controllers. The ability to isolate a local controller that is malfunctioning and maintain communication to and from all other local controllers contributes to greater reliability and integrity of the entire system.

Although particular embodiments of the present invention have been illustrated and described, various modifications, substitutions and alternatives will be apparent to those skilled in the art, and accordingly, the scope of the invention should only be defined by the appended claims and equivalents thereof.

Various features of the invention are set forth in the following claims.

What is claimed is:

1. A system for communicating among two central consoles and a plurality of local controllers, comprising:
    first and second central consoles for controlling the communication of said system, said consoles selectively issuing command messages to said controllers and for receiving response messages therefrom;
    a first two line communication path for selectively transmitting messages in both directions, said first path extending from one central console serially to and being connected to all of said plurality of controllers;
    a second two line communication path for selectively transmitting messages in both directions, said second path extending from the other console serially to and being connected to all of said plurality of controllers, the controllers being connected nearer to said first console via said first path also being connected relatively farther from said second console via said second path;
    an interconnecting communication path interconnecting said consoles;
    said first console being capable of communicating with each of said controllers via said first path an via said interconnecting path, said second console and said second path;
    said second console being capable of communicating with each of said controllers via said second path and via said interconnecting path, said first console and said first path.

* * * * *